United States Patent [19]

Ishii

[11] Patent Number: 4,870,491

[45] Date of Patent: Sep. 26, 1989

[54] DISPLAY CONTROL APPARATUS FOR SUPPLYING DISPLAY DATA TO RASTER SCANNING TYPE DISPLAY DEVICE

[75] Inventor: Takatoshi Ishii, Tokyo, Japan

[73] Assignee: Tokyo Shibaura Denki Kabushiki Kaisha, Kawasaki, Japan

[21] Appl. No.: 867,425

[22] Filed: May 15, 1986

Related U.S. Application Data

[63] Continuation of Ser. No. 533,817, Sep. 19, 1983, abandoned.

[30] Foreign Application Priority Data

Sep. 20, 1982 [JP] Japan ............................... 57-163423

[51] Int. Cl.[4] ............................................... H04N 5/14

[52] U.S. Cl. .................................... 358/160; 340/750

[58] Field of Search ................. 358/140, 160, 183, 22; 340/750, 727, 720; 382/46, 44; 364/518

[56] References Cited

U.S. PATENT DOCUMENTS 4,052,699 10/1977 Micka et al. .......................... 382/46
4,437,121 3/1984 Taylor et al. ........................ 358/160
4,533,952 8/1985 Norman, III .......................... 358/22
4,566,002 1/1986 Miura et al. .......................... 340/727

FOREIGN PATENT DOCUMENTS 0068066 6/1981 Japan .................................. 358/183
0169665 10/1983 Japan .

OTHER PUBLICATIONS

Booth, Kellogg S., "Tutourial: Computer Graphics" IEEE, pp. 78–79, 1979.
Baxes, Gregory A., "Digital Image Processing" Prentice–Hall Inc., pp. 163–164, 1984.

*Primary Examiner*—James J. Groody
*Assistant Examiner*—David E. Harvey
*Attorney, Agent, or Firm*—Cushman, Darby & Cushman

[57] ABSTRACT

A video RAM write control circuit has a video RAM for storing pattern data of one frame at addresses thereof which correspond to display positions, and a control circuit for generating write pattern data and write addresses. The video RAM stores a pattern which is continuous in the horizontal direction, at consecutive addresses thereof. Each row on the screen consists of several rasters. A video RAM address has a memory address representing a position in the horizontal direction, in its lower bits, so well as a raster address representing a raster position of the row, at upper bits thereof. A write address is rotated toward the MSB by the number of bits of the raster address, and a resultant permuted address is supplied to the video RAM.

7 Claims, 7 Drawing Sheets

FIG. 11

| | | | | |
|---|---|---|---|---|
| ℓ | ℓ + 1 | ------ | ℓ + 7 | ℓ + 64 |
| ℓ + 8 | ℓ + 9 | ------ | ℓ + 15 | ℓ + 72 |
| ℓ + 16 | ℓ + 17 | ------ | ℓ + 23 | ℓ + 80 |
| ℓ + 24 | ℓ + 25 | ------ | ℓ + 31 | ℓ + 88 |
| ℓ + 32 | ℓ + 33 | ------ | ℓ + 39 | ℓ + 96 |
| ℓ + 40 | ℓ + 41 | ------ | ℓ + 47 | ℓ + 104 |
| ℓ + 48 | ℓ + 49 | ------ | ℓ + 55 | ℓ + 112 |
| ℓ + 56 | ℓ + 57 | ------ | ℓ + 63 | ℓ + 120 |

FIG. 13

| | | | | |
|---|---|---|---|---|
| ℓ | ℓ + 8 | ------ | ℓ + 56 | ℓ + 64 |
| ℓ + 1 | ℓ + 9 | ------ | ℓ + 57 | ℓ + 65 |
| ℓ + 2 | ℓ + 10 | ------ | ℓ + 58 | ℓ + 66 |
| ℓ + 3 | ℓ + 11 | ------ | ℓ + 59 | ℓ + 67 |
| ℓ + 4 | ℓ + 12 | ------ | ℓ + 60 | ℓ + 68 |
| ℓ + 5 | ℓ + 13 | ------ | ℓ + 61 | ℓ + 69 |
| ℓ + 6 | ℓ + 14 | ------ | ℓ + 62 | ℓ + 70 |
| ℓ + 7 | ℓ + 15 | ------ | ℓ + 63 | ℓ + 71 |

DISPLAY CONTROL APPARATUS FOR SUPPLYING DISPLAY DATA TO RASTER SCANNING TYPE DISPLAY DEVICE

This is a continuation of application Ser. No. 533,817, filed Sept. 19, 1983, which was abandoned upon the filing thereof.

BACKGROUND OF THE INVENTION

The present invention relates to a write control apparatus for a video RAM.

A video RAM is used for the control of a graphic display. A dot pattern, i.e., pattern data indicating whether or not a dot is to be displayed is stored at the address of a video RAM which corresponds to a coordinate position on a display screen. When such a video RAM is connected to the display device of a CRT display, etc., and data is read out from the video RAM, graphic display is realized. In graphic display, one dot is generally represented by 1-bit data. Therefore, if it is assumed that a screen has 200 rows (200 dots) in the vertical direction and 80 columns in the horizontal direction (640 dots, i.e., 8 dots/column), the dot pattern data of one frame comprises 16 kilo byte (KB). If the pattern data is written into the video RAM in units of dots, i.e., if the video RAM is accessible in units of bits, such a configuration is convenient in terms of the write operation. However, in such a case, the addressing space of the video RAM must be quite large, and requires a complex drive circuit. For this reason, each item of pattern data is generally written at a single address of the video RAM in units of several bits. Since a memory generally has a configuration wherein each word comprises 8 bits, the pattern data is stored at individual addresses of the video RAM in units of 8 bits, which are horizontally continuous in a screen area specified by a row and column of the screen. Conventionally, the address of the video RAM for storing the 8-bit pattern data at the upper left corner of the screen is address 0, with the address being sequentially increased toward the lower right side. The respective areas of the screen are so allocated as to have consecutive addresses in the horizontal direction. Thus, the video RAM address l corresponding to an area of an nth row (n=0 to 199) and an mth column (m=0 to 79) may be expressed by the following equation:

$$l=80\times n+m \qquad (1)$$

To write horizontally continuous pattern data, it is sufficient to calculate the address of the initial item of 8-bit data. For the addresses of the remaining data, the address need only be incremented by one for each additional item of 8-bit data. However, the addresses of vertically adjacent areas of the screen are separated by 80 addresses. For this reason, pattern data of vertically continuous areas cannot be continuously written into the video RAM. To store pattern data of vertically continuous areas, the address must be calculated for each item of 8-bit data (the preceding address being incremented by 80), thus resulting in a time-consuming operation. This presents a considerable problem in a personal computer which has a graphic function for processing Chinese character patterns and the like. More specifically, vertical lines, which are frequently included in a Chinese character pattern, cannot be continuously written in a video RAM. This results in a slow display speed of a Chinese character display.

SUMMARY OF THE INVENTION

It is an object of the present invention to provide a write control apparatus for a video RAM. The video RAM is supplied with consecutive addresses to display a dot image for each raster on a raster scanning type display device. The locations corresponding to those addresses store dot data which is consecutive in the horizontal direction, which is written at high speed into the video RAM, the dot data being sequentially displayed in a direction perpendicular to the horizontal direction by supplying the consecutive addresses from a CPU.

BRIEF DESCRIPTION OF THE DRAWINGS

FIG. 11 shows the relationship between each area on the screen and a processor address delivered by the central processing unit address in the first mode according to the third embodiment of the present invention;

FIG. 13 shows the relationship between each area on the screen and a processor address delivered by the central processing unit in the second mode according to the third embodiment.

DETAILED DESCRIPTION OF THE PREFERRED EMBODIMENT

Figure 1:
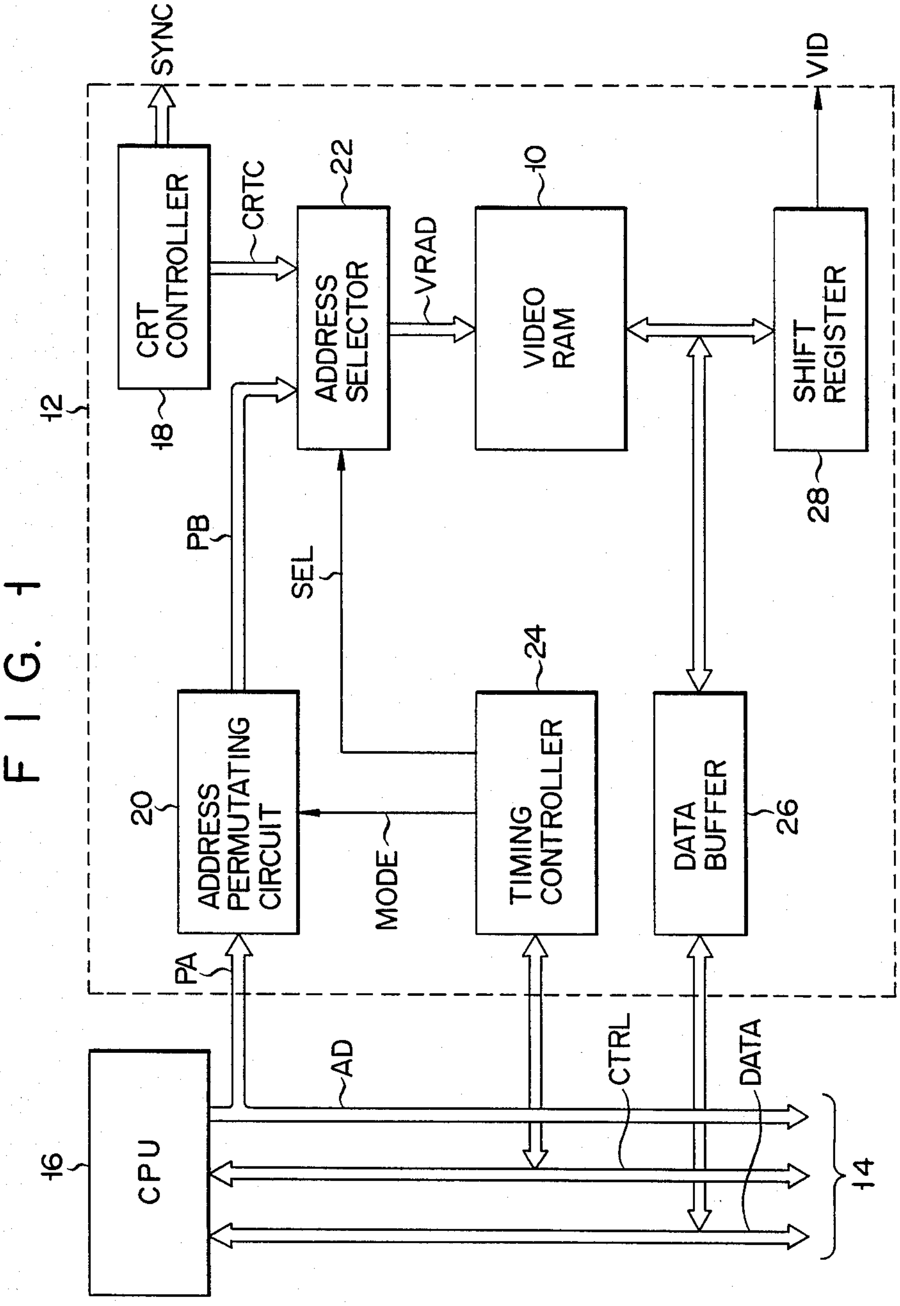
FIG. 1 is a block diagram of a write control apparatus for a video RAM according to an embodiment of the present invention.

A write control apparatus for a video RAM according to a preferred embodiment of the present invention will now be described with reference to the drawings. FIG. 1 is a block diagram of the first preferred embodiment. Video RAM 10 is used to drive the display screen according to the operation of this embodiment. Video RAM 10 is a semiconductor memory of a dynamic drive type which records one dot as one data bit in this embodiment. The display screen used in the preferred embodiment includes 25 vertically extending rows, each row having 8 rasters. There are also 80 columns which extend in the horizontal direction, and each of these 80 columns include 8 dots, yielding a 640 dot column. This can be pictorially seen with reference to FIG. 5 which shows 25 rows, each row having 8 rasters, and 80 columns.

Figure 5:
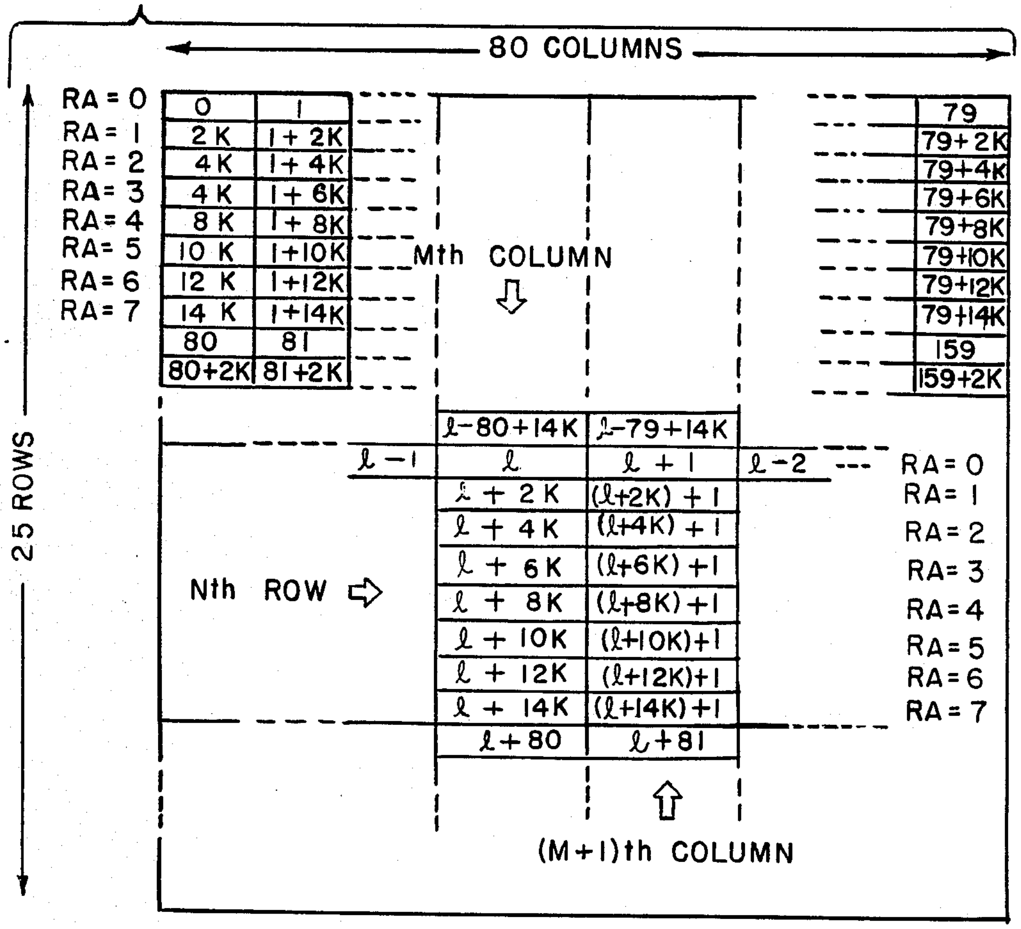
FIG. 5 shows the relationship between each area on the screen and processor address delivered by the central processing unit in the first mode; address VRAD, the CRTC address (Mh, RA) and the processor address PA have the of the address permutating circuit in the second mode.

Video RAM 10 stores 1 byte =8 bits =8 dots at a single address. Each box shown in FIG. 5 represents one of these single addresses. Therefore, in order to include enough information to drive the entire screen in FIG. 5, the video RAM must have an addressing space of 16K.

The preferred embodiment operation will now be discussed herein with reference to FIG. 1. A display control unit 12 includes the video RAM 10, and is connected to a central processing unit (herein CPU) 16. CPU 16 controls write control using the system bus 14. System bus 14 includes an address bus AD, a control bus CTRL, and the data bus DATA. A CRT controller is also provided within the display control unit along with an address permutating circuit 20, address selector 22, timing controller 24, data buffer 26, and shift register 28. The CRT controller has a function of reading data from the video RAM to display a dot pattern on a CRT display (not shown).

The CRT controller 18 supplies a CRT controller address, hereinafter called CRTC address, which includes a CRT Memory Address (MA) and a CRT Raster Address (RA). This CRTC address is used as a read address to the video RAM 10. The CRT controller 18 also supplies a sync signal SYNC to the CRT display.

Address permutating circuit 20 is connected to the address bus AD, and receives a processor address PA from CPU 16. This processor address PA represents a write address to the video RAM 10. Timing controller 24 is connected to control bus CTRL, and supplies a mode switch signal to the address permutating circuit 20. In response to the MODE switch signal, the address permutating circuit 20 will be set in either the first or second mode. In the first address permutating mode, no bit permutating will be performed whatsoever, and the processor address PA will be converted to processor address PB with no changes. However, when circuit 20 is in the second mode, this circuit will rotate and shift the input processor address PA towards the least significant bit by three bits in order to produce a bit rotated address PB. This operation will be described in detail herein.

As shown in FIG. 1, the output address of the CRT controller, CRTC address is supplied to one input of address selector 22. The output address of address permutating circuit 20, address PB, is supplied to the other input terminal of address selector 22. Timing controller 24 supplies a selection signal SEL to the address selector 22. Based on this selection signal SEL, the address selector 22 will choose one of its input signals (CRTC or PB) as the video RAM access address VRAD which will be discussed herein. A physical address, indicating a row and a column address of the video RAM 10 is generated based on this VRAD address.

Data buffer 26 is connected to data bus DATA, and to the video RAM 10, and stores read/write data from video RAM 10. Shift register 28 converts the parallel read data from the video RAM 10 into a serial video signal VID and supplies the obtained signal VID to the CRT display.

Figure 2:
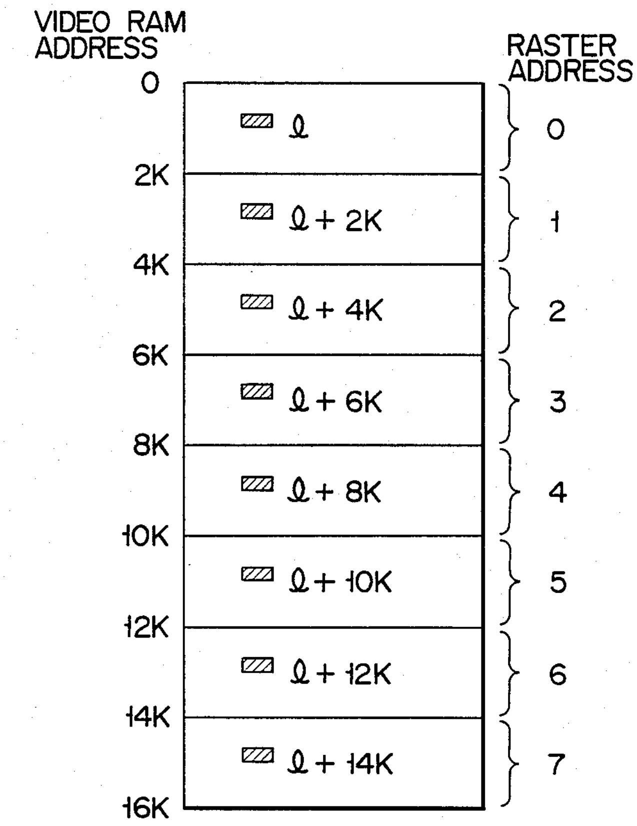
FIG. 2 is a memory map of the video RAM of the apparatus shown in FIG. 1.

As discussed above, the video RAM must have an addressing space of 16K in order to accommodate the screen described herein. FIG. 2 shows an address map of the video RAM 10 according to the preferred embodiment. Since each row corresponds to 8 rasters, the addressing space within the video RAM is divided into 8 areas, each area including 2K of memory and corresponding to one raster address. These 8 raster addresses are sequentially numbered, RA = 0, . . . , 7.

By using this memory and map, 8 bit data which is at adjacent columns within a particular row will be stored at addresses which are separated by 2K bits respectively. This can also be seen with reference to FIG. 5. In FIG. 5, the column in the Nth row has respective memory addresses labelled as l, l+2K, l+4K . . . . Thus, it can be seen that adjacent columns within a given row are separated by an address space of 2K bits.

Figure 3:
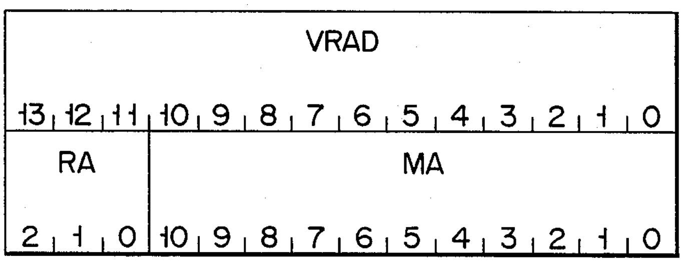
FIG. 3 shows the relationship between a video RAM address and a CRTC address including a memory address (MA) and a raster address supplied from a CRT controller for reading data out of the Video RAM shown in FIG. 2.

In order to use the data in video RAM to create such a memory map, the video RAM address VRAD will use the bit array as shown in FIG. 3. The video RAM address VRAD includes 14 bits numbered 0–13 from least significant to most significant. Bits 0–10 of VRAD correspond to an 11-bit memory address MA. Bits 11–13 of VRAD correspond to a 3-bit raster address RA. Thus, since $2^{11}=2K$, bits 0–10 can access the bit data within each area of 2K shown in FIG. 2. That is, within a particular raster address, where this raster address RA remains constant, the bit data is accessed using the memory address MA. [In other words, the memory address will indicate a position in the horizontal direction within a given raster in a given row]. A raster address will indicate a position in the vertical direction within a given column of a given row.

The operation of this embodiment will be described as follows. Timing controller 24 performs various timing control operations in accordance with various control signals supplied from CPU 16 through control bus CTRL. Timing controller 24 supplies a selection signal SEL to the address selector 22. This selection signal will be operative to select the output address PB from the address permutating circuit in a write mode, and to select the output address CRTC from the CRT controller 18 in a read mode. In the write mode, operation can proceed either by first or second mode, depending on the mode of the address permutating circuit 20. This mode setting will be performed based on a predetermined program, in accordance with the type of write pattern, i.e. letters of the alphabet, Chinese characters, and the like.

Figure 4A:
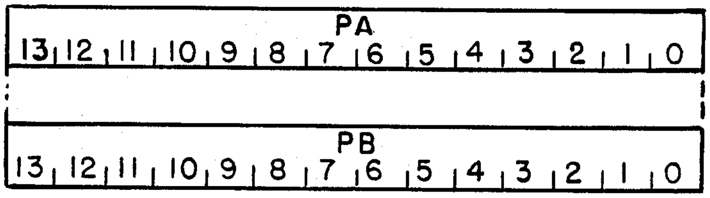
FIG. 4A shows bit arrays of input/output addresses of an address permutating circuit in the first mode.
Figure 4B:
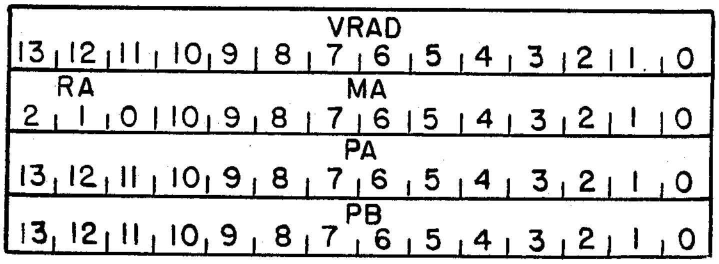
FIG. 4B shows the relationship among bit arrays of a video RAM address, a CRTC address and a processor address delivered by a central processing unit in the first mode.

The operation of the address permutating circuit 20 in the first mode will now be described. In the first mode, as shown in FIG. 4A, processor address PA from the CPU 16, as an input to address permutating circuit 20, will be directly converted to the output address PB at the output of the address permutating circuit. Address selector 22 will then supply address PB to the video RAM 10 as a video RAM address VRAD. At this time, the relationship between the processor address PA, processor address PB, memory address MA, raster address RA and video address VRAD will be such as shown in FIG. 4B. Since processor address PA is not permutated by the address permutating circuit 20, processor address PB is the same as processor address PA, as shown. Therefore, this address also becomes video address VRAD. The relationship between VRAD and memory address MA and raster address RA has already been discussed with reference to FIG. 3. These four addresses are shown together in FIG. 4B in order to clarify these relationships.

That is, the 11 lower bits of address PA correspond to memory address MA. The three upper bits of address PA correspond to bits 0–2 of the raster address RA. Therefore, by incrementing processor address PA by 1, the address stored into the video RAM will also be incremented by 1 (that is, MA will be incremented) and will typically represent an address on the video screen separated from the previous address by 1. This will represent a horizontally adjacent address. However, in order to obtain a vertically adjacent address, it will be necessary to access the next raster, requiring an increment to the processor address of $2^{11}=2K$. In this manner, consecutive processor addresses PA correspond to consecutive addresses at the video RAM, and consecutive addresses in the horizontal direction. As such, a dot pattern which is continuous in the horizontal direction can be written at a relatively high speed, because only an increment of one is necessary to the address in order to write horizontally consecutive addresses.

FIG. 5 shows the relationship between the different areas on the screen and a processor address PA, when address permutating circuit 20 is in the first mode. Each block on the screen represents an 8-bit display area indicative of 8 dots on the display screen. Each block can be designated by a row (25 rows) a column (80 columns) and a raster (8 rasters per row). The 8 rasters of each row are assigned raster addresses RA from 0–7, numbered from the top. Rows N are numbered in the order of 0–24 from the top, and columns M are numbered in the order of 0–79 from the left.

In FIG. 5, the address l represents an area in the Nth row, Mth column, and 0th raster. This address can be expressed by the following equation:

$$l=80\times N+N.$$

This equation can be derived from the teachings found above. This is, [horizontally adjacent areas] on the screen, in this mode, are represented by addresses which are separated by one. By starting in the upper left hand corner of the screen, the first address is 0 and the second address is one, as shown in FIG. 5. Therefore, the last address in the 0th raster of the first row (row 0) will be address 79, since there are 80 columns in each row. The first address in the 0th raster of the second row (row 1) will thus be consecutively numbered from the last address in the 0th raster of the first row. Thus, this next address will be address 80. Similarly, within the 0th raster, each row will include 80 addresses corresponding to the 80 columns. Therefore, by multiplying the row number by 80, the address of the first address in this row will be obtained. By adding the column number to this address, the address of the particular area can be calculated. Since the remaining rasters in any row are separated from the previous raster by 2K, the address of the remaining rasters of the Nth row in Mth column can be given as:

$$l=(80\times N+N)+RA\times 2K.$$

Thus, processor addresses PA for areas which are continuous in the vertical direction are separated by 2K.

Figure 6A:
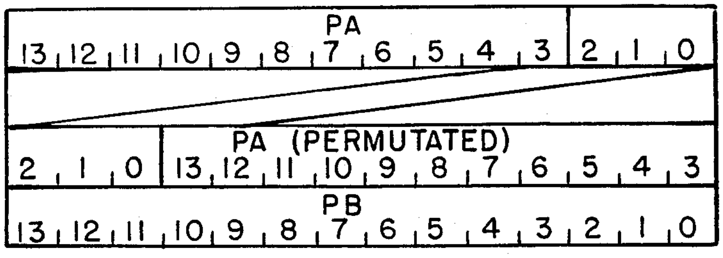
FIG. 6B shows the relationship among bit arrays of a video RAM address, a CRTC address and a processor address permitted by the address permitting circuit in the second mode; MA. The three upper bits, i.e., bits 11 to 13, of the screen and a processor address delivered by the central processing unit in the second mode.

The operation of the second mode will now be described. As described above, when address permutating circuit 20 is in the second mode, the output address PB is obtained by shifting and rotating the processor address PA towards the least significant bit by 3 bits. This is pictorially depicted in FIG. 6A. The processor address PA is shown in FIG. 6A, and this processor address PA is shifted 3 bits towards the least significant bit. Therefore, as shown in FIG. 6A, the shifted PA, or PA permutated, includes bits 0–2 of PA as the highest significance bits of PA permutated, with bits 3–13 of PA corresponding to the eleven lowest significance bits. This PA permutated thus becomes output address PB. The address selector 20 then supplies this address PB to the video RAM 10 as a video RAM address VRAD.

Figure 6B:
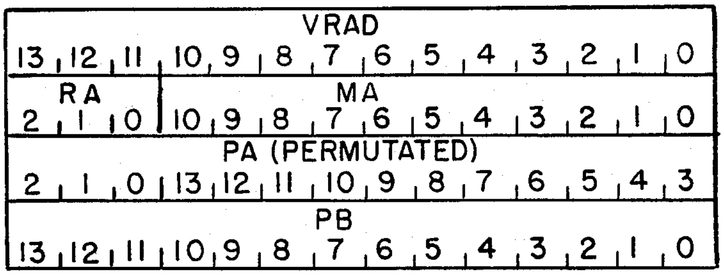

FIG. 6B thus shows the relationship between video address VRAD, memory address MA, raster address RA, PA permutated and PB. The relationship between PA permutated and PB has already been discussed above. By switching address PB through address selector 22, signal PB becomes video address VRAD. The relationship between video address VRAD and memory address MA and raster address RA has been discussed with reference to FIG. 3, and these relationships are also depicted in FIG. 6B. It can thus be seen that the relationship between PA permutated and VRAD is as shown in FIG. 6B. More specifically, the three lowest significance bits of processor address PA become the raster address RA in the second mode, and bits 3–13 of the processor address PA become bits 0–10 of the memory address MA, respectively.

Therefore, in the second mode, when the processor address PA is incremented by one, this will increment bit 11 and cause a corresponding increment to PB of $2^{11}$—making an increment of one to the raster address RA. When the processor address address PA is incremented by $2^3$, causing an increment to bit 3 of the processor address PA, this will yield a corresponding increment to PB of $2^0$, and the memory address MA will then be incremented by one. In this manner, consecutive processor addresses PA correspond to consecutive raster addresses RA. Since consecutive raster addresses RA correspond to vertically consecutive addresses, this second mode allows incrementing processor address PA by one to cause a one vertical position movement. When the processor address PA is incremented by one eight times, addresses of the video RAM corresponding to eight rasters in a given row in a given column are respectively indicated. In other words, a dot pattern which is continuous in the vertical direction can be written at consecutive processor addresses PA for eight consecutive rasters. This second mode thus allows a dot pattern continuous in the vertical direction within a column and a row to be written in the video RAM at high speed.

FIG. 7 shows the relationship between the different areas on the screen and the processor address PA, when address permutating circuit 20 is in the second mode. FIG. 7 thus corresponds to FIG. 5, except for showing addressing in the second mode. An address l of an area having a raster address RA, in an Nth row and an Mth column can be expressed by the following relationship:

$$l=8(80\times N+M)+RA.$$

This relationship can be derived using similar reasoning to that discussed above. As can be seen from this equation, within a given raster, horizontally consecutive addresses are separated by eight memory addresses. Within a given raster, vertically adjacent rows are separated by 640. However, within a row, vertically consecutive rasters are separated by an address of one.

Eight bit data corresponding to 8 dots is written in each address. Therefore, to write a character pattern of 16×16 dots, data merely need be written at 16 consecutive addresses starting from l, and 16 consecutive addresses starting from l+640. The character pattern of 16×16 dots is very useful for writing a Chinese character dot pattern at high speed.

Figure 8A:
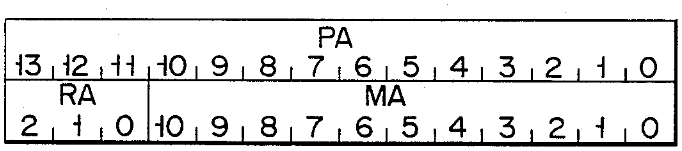
FIGS. 8A and 8B respectively show the relationship between a CRTC address (a memory address and a raster address MA is incremented by one address VRAD. However, the address in the first and second modes viewed from the standpoint of the central processing unit.
Figure 8B:
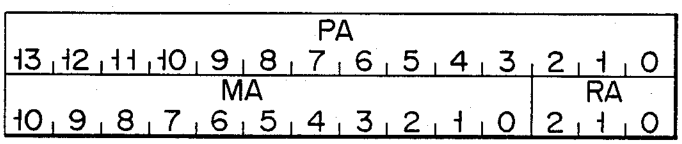

In the read mode, the timing controller 24 supplies select signal SEL to the selector 22 in order to select CRTC address from the CRT controller 18. Therefore, this CRTC address becomes the video RAM address VRAD to the video RAM 10. As discussed above, in the first mode, the relationship between the processor address PA and memory address MA and raster address RA is as shown in FIG. 8A. In the second mode, the relationship between PA, RA and MA are shown as in FIG. 8B. Therefore, when data is read which was written in the first write mode, the CRTC address will translate into a memory address MA in the lower bits and a raster address RA in the upper bits, as shown in FIG. 8A. Conversely, when data which was written in the second mode is read, the address will translate into a raster address RA occurring in the lower bits 0–2, and the memory address MA occurring in the upper bits 3–13 as shown in FIG. 8B. When such a CRTC address is supplied to video RAM 10, the data stored in the video RAM 10 is read out and displayed by the CRT display.

Therefore, according to this embodiment, a write address to the CPU is either selectively permutated, or is not permutated by the address permutating circuit 20. Therefore, a pattern which is continuous in either the horizontal or vertical direction can be selectively written at high speed, depending on the mode chosen.

Another embodiment of the present invention will be described as follows. This second embodiment relates to a modification of the address permutating circuit 20. Therefore, since the overall block diagram of this second embodiment will remain the same as in the first embodiment, this diagram has been omitted. In the first embodiment, since processor address PA is shifted and rotated towards the least significant bit, all of the bits thereof are permutated. Thus, the hardware of this permutating circuit 20 used in performing this operation becomes relatively complicated. In view of this complexity, the second embodiment provides an address permutating circuit which permutates only a limited number of upper bits and a limited number of lower bits, and keeps the remaining bits of the address unchanged. The operation of this circuit will be discussed herein with reference to FIGS. 9A and 9B.

Figure 9A:
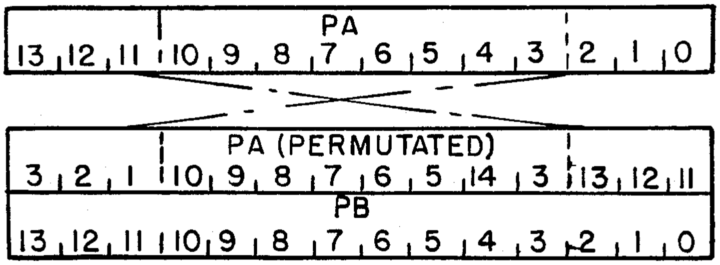
FIG. 9A shows address permutation according to a second embodiment of the present invention.

FIG. 9A shows the bit arrays of the original processor address PA, and the result after a permutation thereof as PA (permutated). Referring to FIG. 9A, the three upper bits 11–13 of address PA become the three lower bits of address PA (permutated) and thus the three lower bits 0–2 of address PB. The three lower bits of address PA correspond to the three upper bits of address PA (permutated) and thus to bits 11–13 of PB.

Figure 9B:
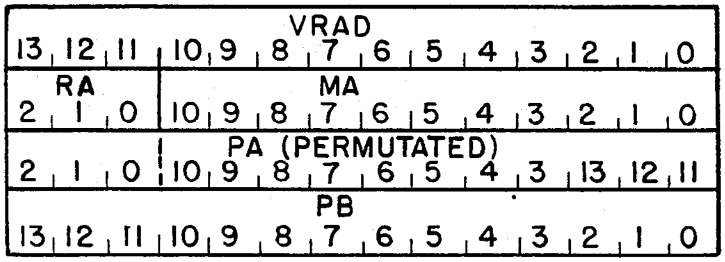
FIG. 9B shows the relationship among bit arrays of video RAM address, a CRTC address (a roster address and a memory address) supplied from a CRT controller and; a processor address permitted by the address permitting circuit; in the second mode according to the second embodiment.

FIG. 9B shows the final relationship between all of these addresses. It can thus be seen that the central 8 bits 3–10 of the 14 bit processor address do not get permutated, so that the amount of hardware of the address permutating circuit can be less than that required in the first embodiment. Furthermore, since the three lower bits 0–2 of the processor address PA become the raster address RA when signal PB is switched through address selector 22, a pattern which is continuous in the vertical direction can be written at consecutive processor addresses for eight rasters. Since bit 3 of address PA corresponds to bit 3 of address PB and thereafter address VRAD, vertically consecutive addresses represents vertically consecutive locations on the screen. However, the processor address PA cannot designate a next continuous column in the raster direction after designation of the 8 consecutive rasters within a particular row. When the memory address changes by 8, the data of areas which are 64 bits distant within the same raster on the screen are written at consecutive processor addresses PA. Thus, the calculation of addresses of areas which are continuous columns in the raster direction becomes difficult. Thus, while this embodiment allows minimization of the amount of hardware, a larger amount of software is necessary.

Figure 10:
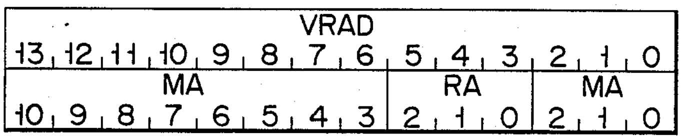
FIG. 10 shows the relationship between bit arrays of a video RAM address and a CRTC address supplied from the CRT controller including a raster address and a memory address in a third embodiment of the present invention.

A third embodiment of the present invention will be described herein. According to this third embodiment, the address delivered to the video RAM 10 as video RAM address VRAD includes the raster address RA and a memory address MA which has the bit array configuration as shown in FIG. 10. In this case, the raster address RA changes for every eight memory addresses, and the 64 bit pattern will be horizontally continuous as shown in FIG. 11. This process is repeated for eight rasters. A memory map for this case is different from that shown in FIG. 2.

Figure 12A:
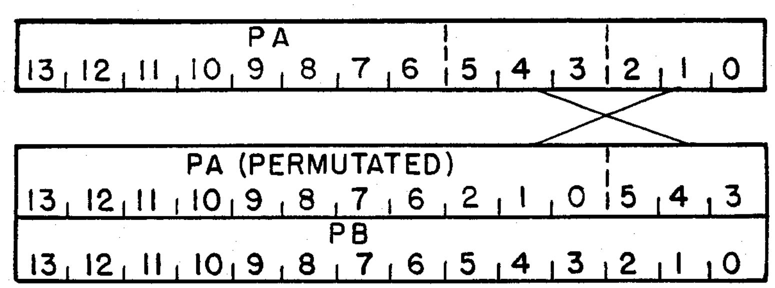
FIG. 12A shows address permutation according to the third embodiment of the present invention.
Figure 12B:
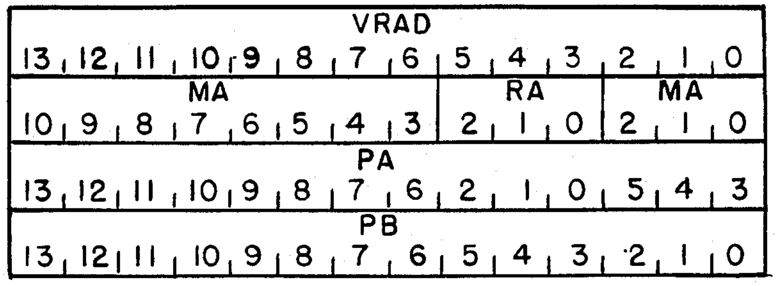
FIG. 12B shows the relationship among bit arrays of a video RAM address a CRTC address supplied from the CRT controller and a processor address permitted by the address permitting circuit in the second mode according to the third embodiment.

FIG. 12A shows the relationship between an input address PA and an output address PB of an address permutating circuit of the third embodiment. Bits 0–2 of address PA are permutated to be located in positions of bits 3–5 of address PB. The relationship between processor address PA, output address PB, raster address RA, memory address MA and VRAD is as shown in FIG. 12B. Bits 0–2 of address PA correspond to bits 0–2 of raster address RA, while bits 3–13 of address PA correspond to bits 0–10 of memory address MA. When the processor address PA is permutated as shown in FIG. 12A, the video RAM addresses of respective areas on the screen become as shown in FIG. 13. Thus, according to this third embodiment, the raster address is inserted between bits 2 and 3 of memory address MA, so that the pattern which is continuous in the horizontal direction can only be written for 64 bits in the first mode of permutation. The amount of hardware required for the permutation of processor addresses and writing a pattern continuous in the vertical direction can, however, be decreased.

According to the present invention, one of a pattern which is continuous in the horizontal direction, and a pattern which is continuous in the vertical direction can be selectively written using a consecutive addresses of a video RAM. Thus, a complex pattern, such as a Chinese character pattern, can be written in the video RAM at high speed.

Although one row includes 8 rasters in the above embodiments, it may have 4, 16, or other numbers of rasters. When a row has 16 rasters, a Chinese character font of 16×16 dots can be written with a single string command. When a row has four rasters, the apparatus can be applied to a system having 20 rasters per row.

What is claimed is:

1. A display control apparatus for supplying dot data in synchronism with a timing of raster scanning to a display device of a raster scanning type for displaying a dot image, comprising:

a video RAM for storing dot data corresponding to an image to be displayed on a screen of said display device, each storage location of said video RAM storing dot data for p dots, where p is a positive integer;

control means for outputting write address data comprising lower q-bit memory addresses and higher r-bit raster addresses, to read out the dot data from said video RAM to be supplied to said display device, said memory addresses each indicating a position on the screen of a dot block including p x 2r dots, p dots in the horizontal direction X and 2r rasters in the vertical direction, said raster addresses each indicating a position of one of the rasters of a dot block;

write means for supplying write addresses and the dot data to said video RAM; and addresses permuting means, receiving said write addresses from said write means and being selectively set in one of first and second modes, for supplying the write addresses to said video RAM without changes in the first mode, and for performing a bit permutation of said write addresses in said second mode and supplying lower r bits of the write addresses to said video RAM at the same bit positions as the raster addresses supplied from said control means to said video RAM and the bit-permuted write addresses to said video RAM.

2. A display control apparatus according to claim 1, in which said address data supplied from said control means to said video RAM includes the q-bit memory addresses in a low-order position and the r-bit raster addresses in a high-order position, and said address permuting means shifts and rotates the write addresses in the least significant bit (LSB) direction so as to permute the lower r bit positions of the write addresses supplied from said write means into the upper r bits in the second mode and supplies the bit-permuted write addresses to said video RAM.

3. A display control apparatus according to claim 1, in which said address data supplied from said control means to said video RAM includes the q-bit memory addresses in a low-order position and the r-bit raster addresses in a high-order position, and said address permuting means permutes the lower r bits and the higher r-bits of the write addresses supplied from said write means and supplies the bit-permuted write addresses to said video RAM in the second mode.

4. A display control apparatus according to claim 1, in which the raster addresses generated by said control means are supplied to said video RAM so as to be interposed in the q-bit memory addresses, and said address permuting means performs bit-permutation so as to set the lower r bits of the write addresses generated from said write means to the same position as the raster addresses, which are interposed in the q-bit memory addresses, supplied from said control means to said video RAM, and supplies the bit-permuted addresses to said video RAM.

5. A write control apparatus for a video RAM which has a plurality of memory segments, the memory segments arranged in one horizontal line constituting a raster, $2^r$ rasters constituting a row, the memory segments in each raster being divided into a plurality of columns, memory segments included in one column and one row constituting a block of memory segments, each block of memory segments being designated by a memory address, each raster in one block of memory segments being designated by a raster address of r bits, comprising:

means for generating a control address which is successively incremented;

first converting means, connected to said generating means, for converting the control address into a first write address having a raster address and a memory address, said first converting means converting the lowest r bits of the control address into the raster address;

second converting means, for converting the control address into a second write address having the raster address and the memory address, said second converting means converting the lowest r bits of the control address into the lowest r bits of the memory address;

means for selectively supplying one of the first write address and the second address to the video RAM.

6. An apparatus according to claim 5, in which said first converting means converts remaining bits other than said lowest r bits of the control address into the memory address, and said second converting means converts r bits among said remaining bits other than said lowest r bits of the control address into the raster address.

7. An apparatus according to claim 5, in which each of said converting means and said second converting means comprise means for permutating the bits of the control address.

* * * * *